United States Patent [19]
O'Callaghan

[11] Patent Number: 5,114,802
[45] Date of Patent: May 19, 1992

[54] CAUSTIC-BASED METAL BATTERY WITH SEEDED RECIRCULATING ELECTROLYTE

[75] Inventor: Wilfrid B. O'Callaghan, Kingston, Canada

[73] Assignee: Alcan International Limited, Montreal, Canada

[21] Appl. No.: 577,519

[22] Filed: Sep. 5, 1990

[51] Int. Cl.$^5$ .................................. H01M 12/06
[52] U.S. Cl. .................................... 429/13; 429/29
[58] Field of Search ......................... 429/29, 206, 13

[56] References Cited

U.S. PATENT DOCUMENTS

| | | | |
|---|---|---|---|
| 4,657,754 | 4/1987 | Bauer et al. | 501/127 X |
| 4,942,100 | 7/1990 | Hunter et al. | 429/206 X |
| 5,004,654 | 4/1991 | Hunter et al. | 429/206 X |

FOREIGN PATENT DOCUMENTS 52-45891 11/1977 Japan ................................ 429/29

Primary Examiner—Stephen Kalafut
Attorney, Agent, or Firm—Cooper & Dunham

[57] ABSTRACT

A battery and a method for its operation are described. The battery comprises a caustic-based metal, e.g. aluminum, battery with a cathode adapted to reduce oxygen and a metal anode positioned in spaced juxtaposed relation to the cathode to define therewith an anode-cathode gap for receiving electrolyte to form an anode-cathode pair electrically coupled by electrolyte. The battery contains an alkaline electrolyte and seed particles adapted to decrease passivation of the anode during discharge of the battery. The seed particles are α-alumina of very fine particle size distribution obtained by calcination of high-purity alum.

13 Claims, 8 Drawing Sheets

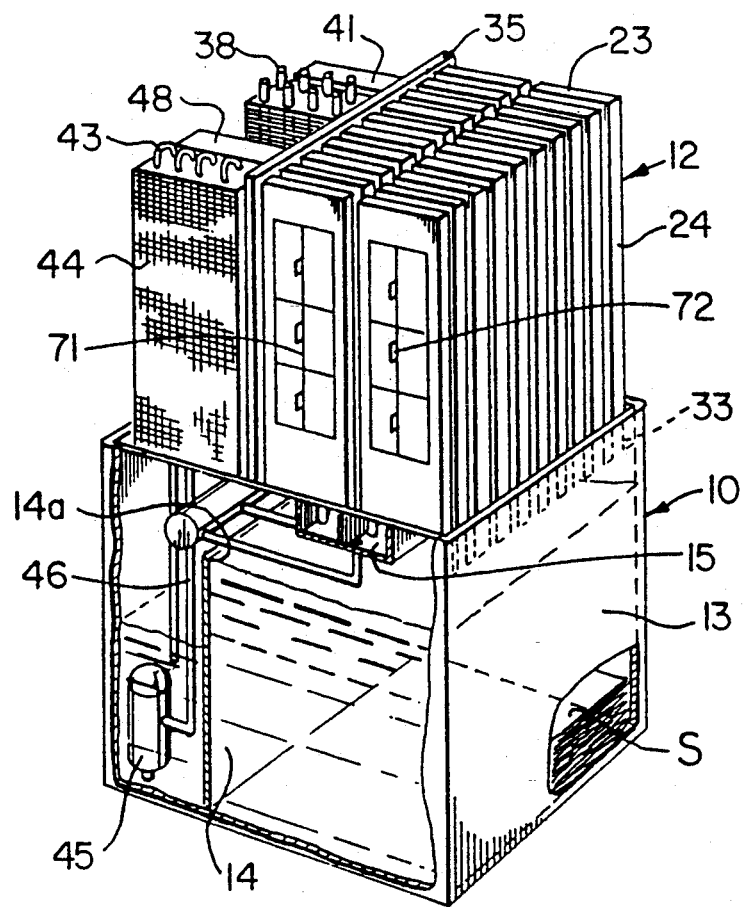
FIG. 1
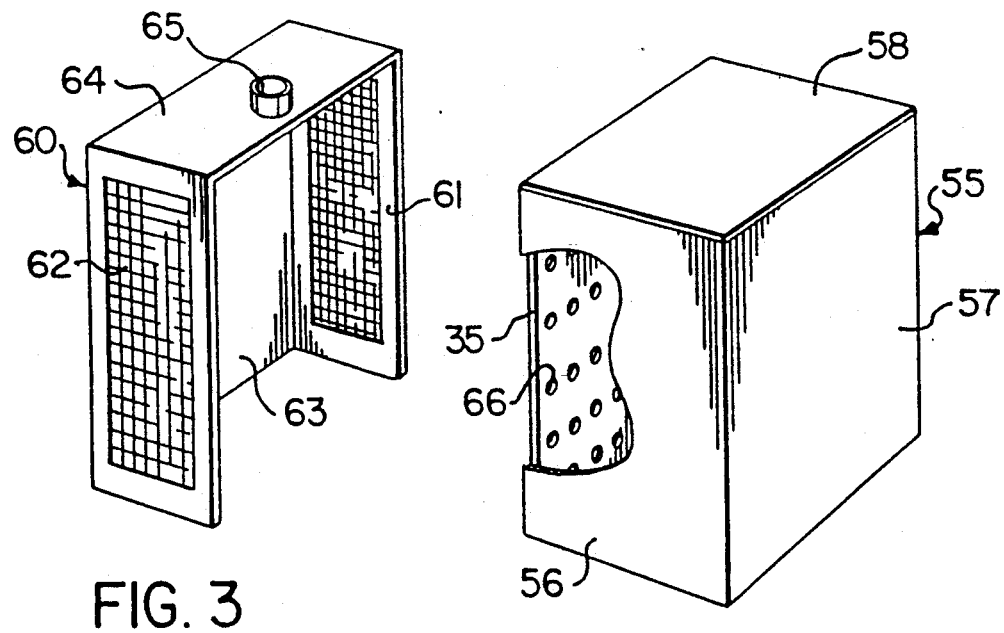
FIG. 3
FIG. 2

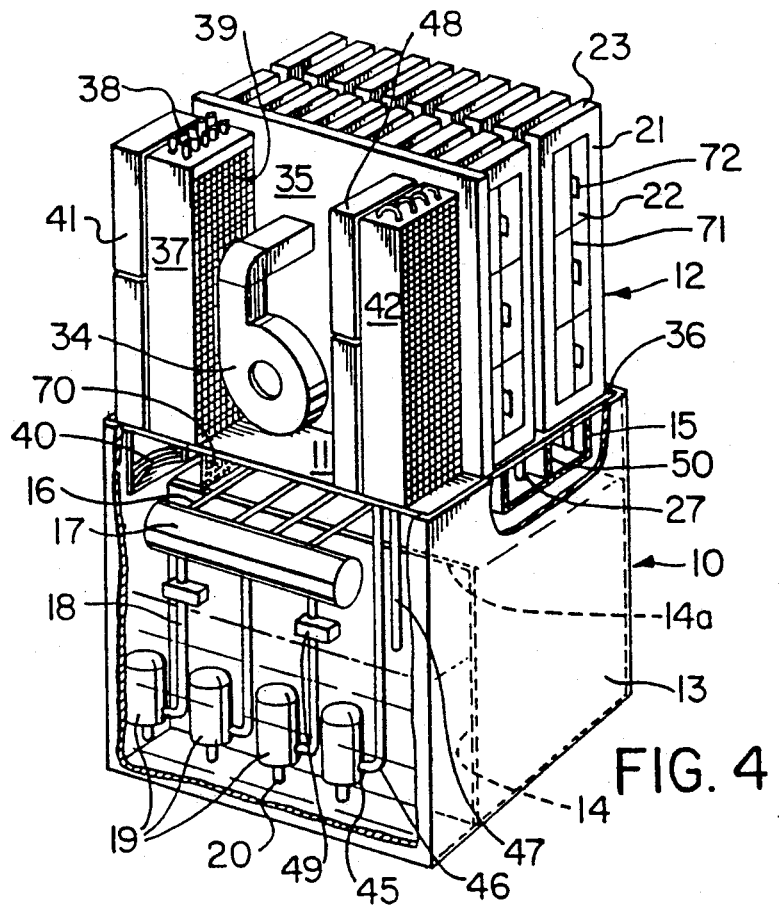
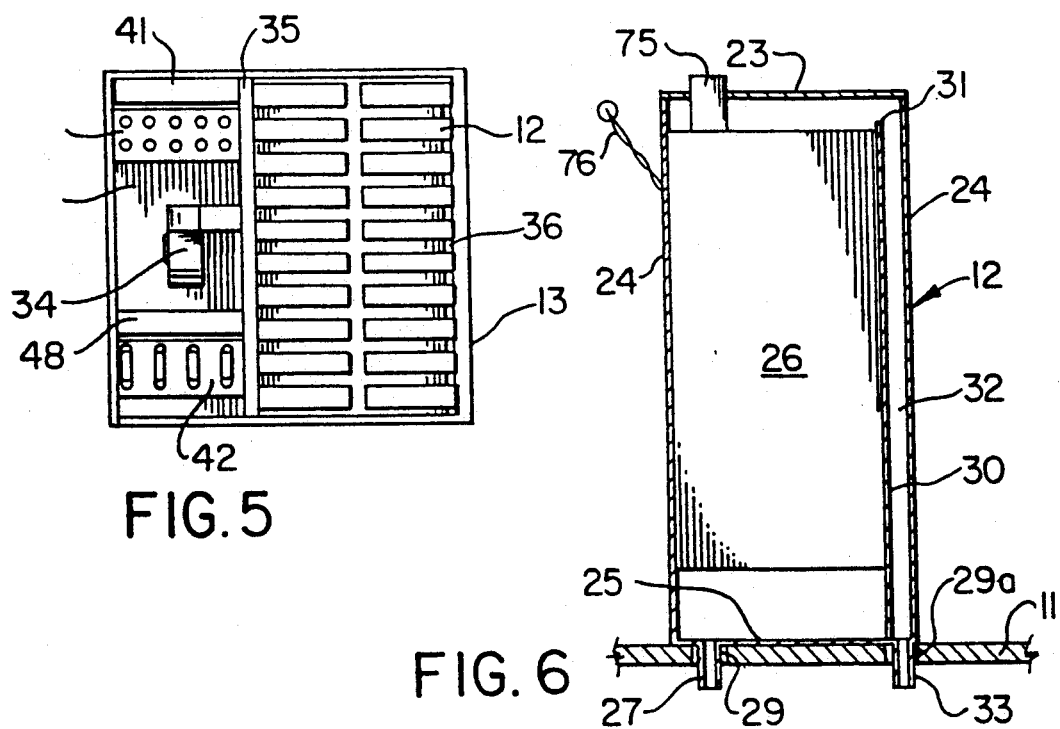

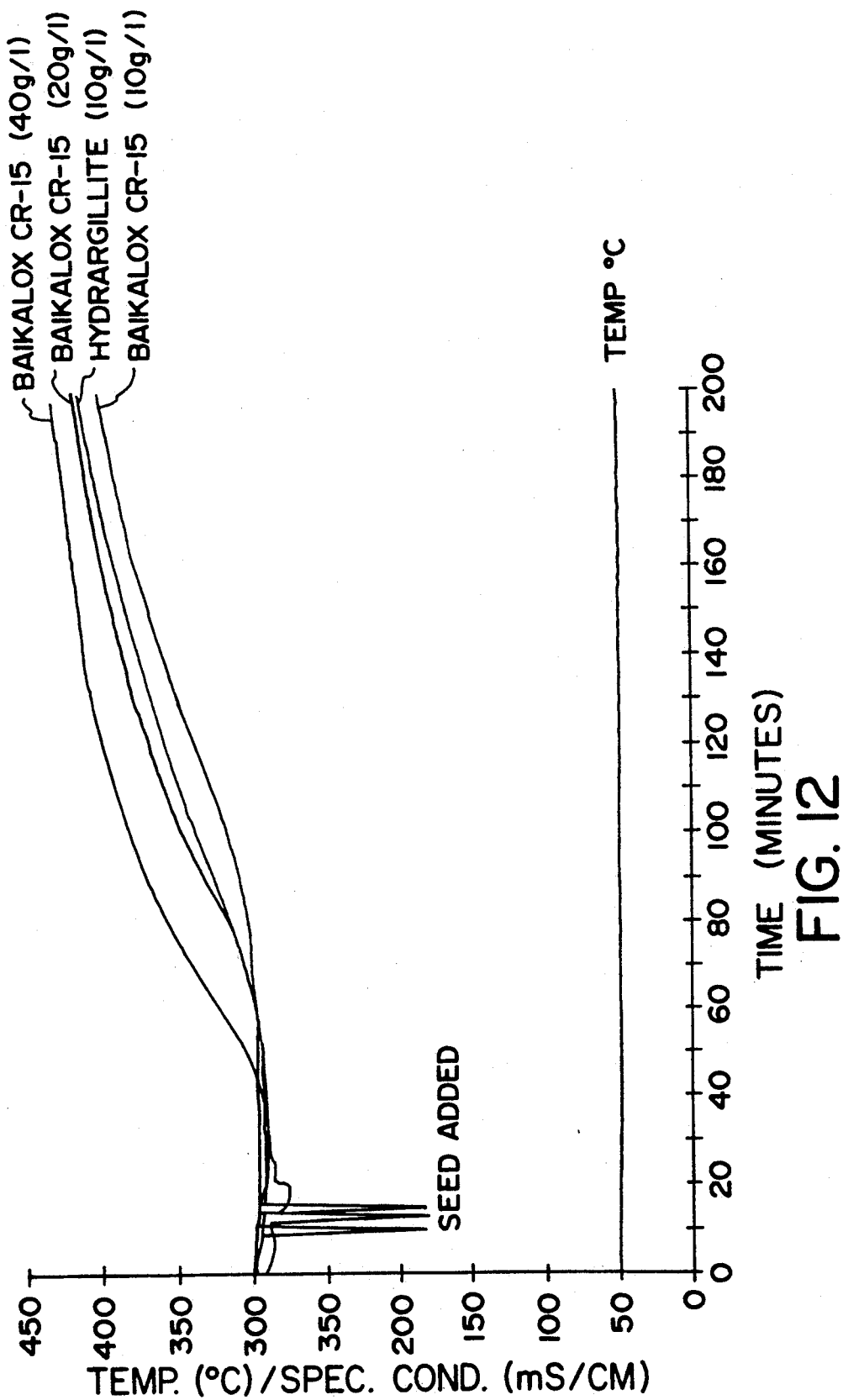

CAUSTIC-BASED METAL BATTERY WITH SEEDED RECIRCULATING ELECTROLYTE

BACKGROUND OF THE INVENTION

The invention relates to caustic-based metal batteries and methods for their operation, and particularly aluminum anode batteries having recirculating caustic electrolyte containing a particulate seeding agent.

Caustic-based metal batteries produce electricity by the electrochemical coupling of a reactive metallic anode to an air cathode through a suitable electrolyte in a cell. The air cathode is typically a sheet-like member, having opposite surfaces respectively exposed to the atmosphere and to the aqueous electrolyte of the cell. During cell operation oxygen is reduced within the cathode while metal of the anode is oxidized, providing a usable electric current flow through external circuitry connected between the anode and cathode. The air cathode must be permeable to air but substantially impermeable to aqueous electrolyte, and must incorporate an electrically conductive element to which the external circuitry can be connected. Present-day commercial air cathodes are commonly constituted of active carbon (with or without an added oxygen-reduction catalyst) in association with a finely divided hydrophobic polymeric material and incorporating a metal screen as the conductive element A variety of anode metals have been used or proposed; among them, zinc, alloys of aluminum and alloys of magnesium are considered especially advantageous for particular applications, owing to their low cost, light weight, and ability to function as anodes in metal/air battery using a variety of electrolytes.

Other caustic-based metal batteries may utilize a cathode comprising a nickel surface impregnated with a catalyst. This cathode does not have a surface exposed to air or oxygen. Instead, the liquid electrolyte contains hydrogen peroxide in solution which is reduced by the cathode while the metal of the anode is oxidized, thereby providing a useable electric current flow.

A typical aluminum/air cell comprises a body of aqueous electrolyte, a sheet-like air cathode having one surface exposed to the electrolyte and the other surface exposed to air or oxygen, and an aluminum alloy anode member (e.g. a flat plate) immersed in the electrolyte in facing spaced relation to the first-mentioned cathode surface.

The aqueous electrolyte for caustic-based aluminum batteries typically consists of a highly alkaline solution. The highly alkaline electrolyte usually consists of NaOH or KOH solution.

In alkaline electrolyte, the cell discharge reaction may be written:

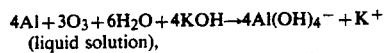

followed, after the dissolved potassium (or sodium) aluminate exceeds saturation level, by:

In addition to the above oxygen-reducing reactions, there is also an undesirable, non-beneficial reaction of aluminum in both types of electrolyte to form hydrogen, as follows:

$$2Al + 6H_2O \rightarrow 2Al(OH)_3 + 3H_2(gas)$$

There is a need for a caustic-based aluminum battery which can be used as an emergency power source at locations where electric supply has been temporarily disrupted. Such a battery must have a high energy capacity and be capable of running for a long period of time under high load, e.g. deliver in excess of 500 watts with an energy density in excess of 365 Wh/kg. During discharge of a battery containing aluminum anodes and caustic electrolyte, the concentration of dissolved aluminum in the electrolyte continues to build up until a limiting level of super- saturation is reached such that no more aluminum from the anode can enter into solution. At this point a film or scale of aluminum hydroxide forms on the anode surface causing passivation of the anode and collapse of the battery voltage.

The solubility of aluminum hydroxide increases with temperature and with caustic concentration. In metal-air batteries, caustic concentrations are chosen to maximize electrical conductivity and are typically in the range of 4–5 molar. At this caustic level the aluminum solubility at the prevailing battery temperature of 55°–75° C., corresponds to a molar ratio of dissolved Al to KOH or NaOH of roughly 0.40. Aluminum may continue to dissolve above this ratio into the supersaturated zone and even attain a ratio as high as 0.80. In the supersaturation zone the solution is in a metastable state and has a natural tendency to reduce its dissolved aluminum concentration by precipitating out solid aluminum-oxide trihydrate or bayerite according to the following equation:

or,

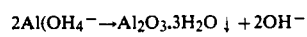

The metastable state possesses great stability, unless a seeding agent is present to induce precipitation, and the Al/XOH ratio can go as high as 0.75–0.80, where anode passivation occurs. High current density and low electrolyte turbulence enhance the tendency to passivate.

Various techniques have been tried to avoid passivation at medium to high current densities and one technique has been to use a very large volume of electrolyte. However, this greatly increases the battery size and weight, thus reducing its energy density and market attractiveness. Another way of extending discharge time prior to passivation has been to use higher caustic concentrations, but this has the effect of reducing electrolyte conductivity and hence battery voltage. Yet another way has been to add organic stabilizers to the electrolyte to improve the meta-stability, or to use NaOH/KOH mixtures to achieve the same effect, but these methods achieve only a relatively small extension of the battery capacity.

Even if the anode does not passivate, there is a further problem with the occurence of very high supersaturation levels corresponding to Al/XOH ratios above 0.70 and that is the uncontrolled nucleation of a vast number of new particles of solid aluminum hydroxide, probably close to the anode surface. These have the effect of increasing the viscosity of the electrolyte to that of a thick soup and thereby clogging the cell and causing battery failure.

There remains a need for a seeding agent to induce hydrargillite or bayerite precipitation which is insoluble in caustic electrolyte, while having a fineness of particle size allowing it to remain suspended in the electrolyte with little or no mechanical stirring.

SUMMARY OF THE INVENTION

According to the present invention, it has been discovered that a very effective seeding agent for caustic based metal, preferably aluminum, batteries with alkaline electrolyte is particles of high purity (preferably 99.99% pure), ceramic grade α-alumina powder of very fine particle size distribution obtained by calcination of high-purity alum. As examples of suitable α-alumina powder, there may be mentioned Baikalox ® CR-15 and CR-10 ceramic alumina powder, manufactured by Baikowski International Corporation.

In the supersaturation zone, the driving force for the precipitating out of solid aluminum-oxide trihydrate or bayerite increases with the square of the supersaturation level, and the rate of the precipitation reaction is directly proportional to the surface area of the seed present. Tests in NaOH electrolyte have shown the reaction rate to be:

Precipitation Rate =
$5.05 \times 10^7 \cdot A \cdot Exp(-14.155/RT) \cdot ((R - Re)/(1 - R))^2$
grams $Al$ per minute Where
A = Seed surface area in square meters
R = Moles Al/moles NaOH
Re = Equilibrium ratio:moles Al/moles NaOH The above equation shows that the presence of seed in the electrolyte is essential to achieve a precipitation rate that is fast enough to avoid the high supersaturation levels that cause anode passivation.

The seed material has very small particle sizes of less than 1 micron and preferably about 0.5 micron. These very small particles move freely through the battery with the flow of electrolyte and have been found to be highly effective in preventing anode passivation.

A problem with many seed materials of small particle size is that they tend to dissolve in fresh electrolyte. Accordingly, they can safely be added to the electrolyte only after several hours of battery discharge when the electrolyte is approaching saturation in dissolved aluminum. However, the seed material of this invention is insoluble in fresh caustic electrolyte and can thus be present and in contact with the electrolyte from the initiation of the battery discharge. This greatly reduces the complexity and improves the reliability of the system.

An additional advantage of the seeding agent of this invention is the fineness of the particle size. This allows it to remain suspended in the electrolyte with little or no mechanical stirring, and prevents it from sedimenting at the bottom of the cells where no stirring is possible. Also, the finer the particle size, the greater the seed surface area per unit weight of seed.

Thus, one feature of the present invention is a method for operating a caustic-based metal battery of the type comprising a cathode adapted to reduce oxygen supplied thereto as oxygen or oxidant and a metal anode positioned in spaced juxtaposed relation to said cathode to define therewith an anode-cathode gap for receiving electrolyte to form an anode-cathode pair electrically coupled by electrolyte. According to this invention, the above seed particles are added to the electrolyte within the battery, preferably at the start of battery discharge. The seeds are used in sufficient quantity to prevent passivation of the anode and thickening of the electrolyte during discharge of the battery.

According to one preferred embodiment, the cathode is an air or oxygen cathode having opposed surfaces supported for simultaneous exposure of a first of said surfaces to air or oxygen and a second of said surfaces to liquid electrolyte. Such cathode is referred to hereinafter as an air cathode. In another embodiment, the cathode has a nickel surface impregnated with catalyst and the electrolyte contains an oxidant, e.g. hydrogen peroxide.

The invention is of particular interest for use in batteries characterized by a supply reservoir for the electrolyte enclosed in a housing below a plurality of metal-air or oxygen cells mounted in side-by-side relationship with air gaps therebetween. Each of the above cells comprises a pair of spaced-apart flat side walls joined by edge faces. The flat side walls include air cathodes and a metal anode is mounted between the flat side walls con- taining the air cathodes in facing spaced relationship to the cathode surfaces. Each cell includes an electrolyte inlet connection in a lower region below the bottom of the anode and an electrolyte outlet connection. The inlet connector is flow connected to pump means for pumping electrolyte from the reservoir and the outlet connector is adapted to return electrolyte to the reservoir. The battery is normally completed by circuit means for connecting the cells in series to each other and to an external load. With this battery, the seeds are preferably added to the electrolyte in the reservoir.

The metal-air cells are typically placed on a support panel with electrolyte inlet and outlet connectors extending through the panel. The electrolyte is pumped upwardly through the inlet connectors and into the metal-air cells.

The outlet connectors extend through the support panel at locations such that the returning electrolyte can flow directly into the electrolyte reservoir.

Each metal-air cell preferably includes a vertical divider wall extending from the bottom edge face up to a short distance below the top edge face. This divider wall provides an electrolyte chamber connected to the electrolyte inlet and an overflow chamber connected to the electrolyte outlet. The top end of the divider wall forms an electrolyte overflow weir and is positioned at or above the top end of the metal anode. With this arrangement, the electrolyte flows upwardly through the metal-air cells and provides a strong flushing action to remove metal hydroxide reaction products formed in the space between the anode and cathode. Thus, metal hydroxide product is carried upwardly and over the weir for discharge back into the reservoir. This reaction product settles to the bottom of the reservoir and the battery can be operated for a considerable period of time before it is necessary to remove the collected solid reaction product from the bottom of the reservoir.

The electrolyte reservoir preferably includes a divider wall which extends upwardly for part of the height of the reservoir to provide a further overflow weir. The electrolyte flowing over the internal weir of the reservoir is substantially free of the solid reaction product and pump inlets are positioned in the reservoir on the downstream side of the weir.

The electrolyte pump may be in the form of a single pump or several small centrifugal pumps may be used. When a single pump is used, it is preferably in the form of a column pump with an impeller submersed in the electrolyte in the reservoir on the downstream side of the weir and a motor mounted above the electrolyte. When several pumps used, they are preferably submersible centrifugal pumps which are mounted in the reservoir on the downstream side of the weir.

In order to intensify the supply of air to the gaps between the metal-air cells, a blower and air distributor are preferably installed adjacent the cells to blow air through the gaps. According to a preferred feature, this air is used for a secondary purpose of flushing the surface of the electrolyte in the reservoir. It has been found that in high load batteries of this type, there can be build-up of hydrogen above the surface of the electrolyte. To avoid this problem and dilute the hydrogen concentration in the reservoir, openings are preferably provided in the support panel between the metal-air cells at the side of the cells remote from the blower. In this manner, the air passing in one direction through the gaps between the cells is forced down through the openings in the support panel and across the surface of the electrolyte in the reverse direction, thereby diluting the hydrogen. This air can then be discharged through a demister and a condenser to the atmosphere.

Also, to control the temperature of the electrolyte, a heat exchanger may be provided through which electrolyte is recirculated from the reservoir. When high electrical outputs are required from the battery, the condenser can be replaced by a second heat exchanger and the air can be discharged directly to the atmosphere.

BRIEF DESCRIPTION OF THE DRAWINGS

These and many other features and advantages of the invention will become apparent as the invention becomes better understood by reference to the following detailed description when considered in conjunction with the accompanying drawings wherein:

FIG. 1 is a schematic view of a metal-air battery with covers removed;

FIG. 2 is a perspective view of a cover for the metal-air cells;

FIG. 3 is a perspective view of a cover for the condenser and heat exchanger;

FIG. 4 is a further schematic illustration of the battery;

FIG. 5 is a top plan view of the battery with cover removed;

FIG. 6 is a cross-sectional view of a metal-air cell;

FIG. 12 is a plot of specific conductance of a supersaturated KOH-aluminate solution as a function of holding time using different concentrations of Baikalox CR-15 as seeds.

DESCRIPTION OF THE PREFERRED EMBODIMENTS

Figure 7:
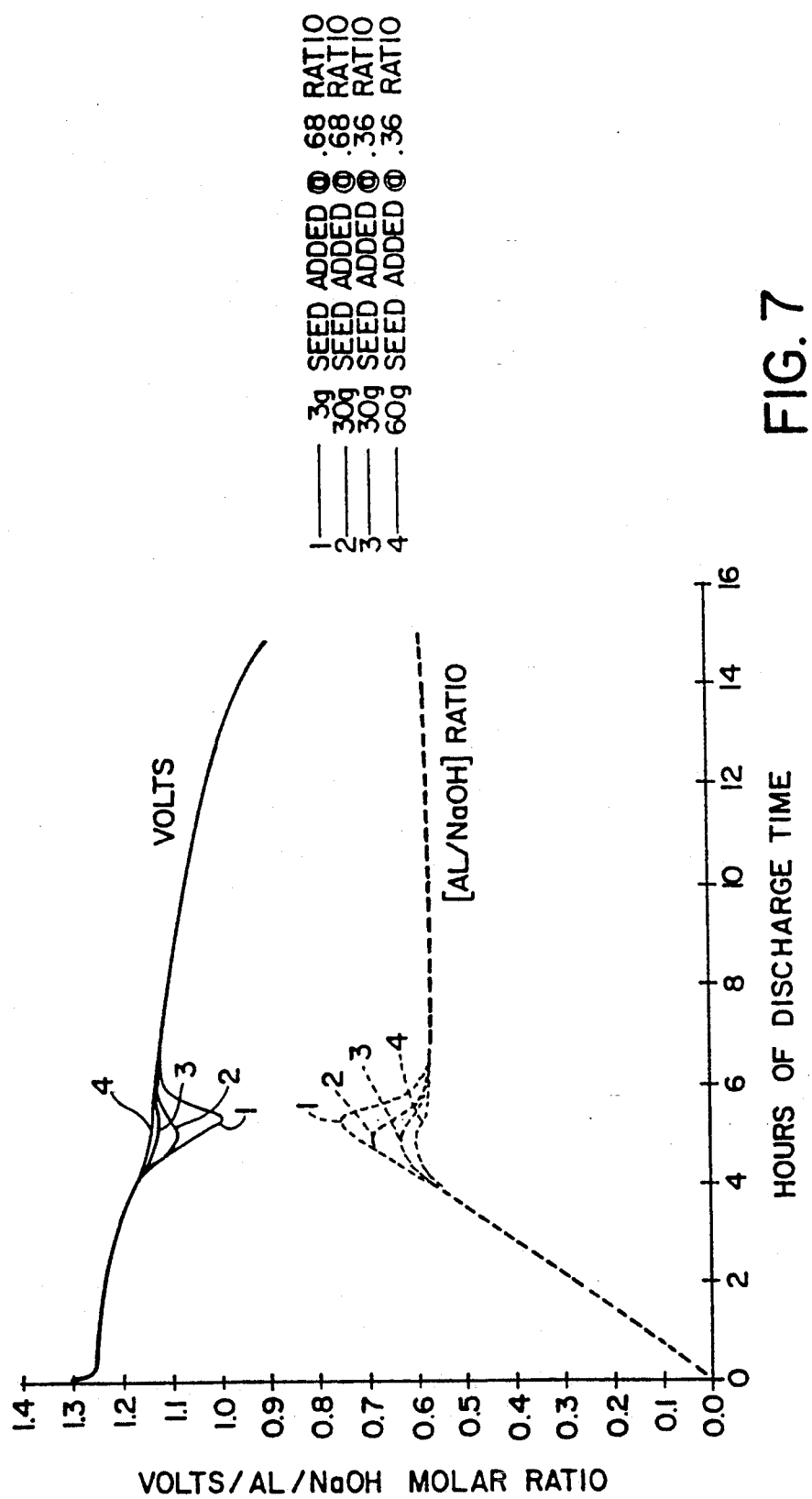
FIG. 7 is a plot of Al/KOH ratio as a function of discharge time.

Referring now to the drawings, a housing 10 with side walls 13 is provided comprising a suitable material resistant to caustic solutions at temperatures up to 95° C., such as polypropylene or 316 stainless steel, and serving as an electrolyte reservoir. Extending across an upper region of the interior of housing 10 is a support panel or platform 11. At one side of the housing, there are gaps 36 in the support panel, providing air openings into the electrolyte reservoir.

Extending upwardly from and supported by the support panel 11 are a plurality of metal-air cells 12 with air gaps therebetween. These cells 12 have a long, flat rectangular shape with side walls 21 having window openings retaining air cathodes 22.

The air cathodes 22 are generally rectangular sheet members fabricated of activated carbon and incorporating an electrically conductive material such a wire mesh. Each cathode 22 extends entirely over an opening in wall 21 with its edges sealingly adhered to the interior surface of the wall around the periphery of the opening. The cathodes in the two side walls are preferably electrically connected such that they effectively form a single cathode surrounding the anode spaced between them. The cathodes are susceptible to hydrostatic deformation which affects the gap between the anode and cathode. To avoid this problem, a supporting grid 71 is provided across the opening in wall 21 and small projections 72 are provided on the outer edges of the grid 71. These projections 72 are arranged so that the projections of adjacent pairs of cells engage each other, thereby providing a rigid structure while permitting free flow of air between the cells.

The side walls 21 are joined by a removable top lid 23, a pair of end walls 24 and a bottom wall 25, the lid 23 tightly sealing within walls 21 and 24. The anode 26 has a vertically extending tab 75 projecting upwardly through a slot in lid 23, and similarly the cathode has a connector lead 76 extending from the side of the cell where the two cathodes are joined. The tab 75 and lead 76 are connected to suitable circuit means (not shown) for connecting the cells in series to each other and to an external load.

A divider wall 30 is formed between side walls 21 near one end wall 24 to form a narrow discharge conduit 32 adjacent the side edge. This divider wall 30 terminates at an upper edge 31 a short distance below the cell top edge 23, the edge 31 forming an overflow weir. Vertical slots are provided in divider wall 30 and side wall 24 to retain an aluminum anode 26. This anode terminates slightly below the top edge 31 of divider wall 30. An inlet tube 27 connects to bottom edge 25 beneath the anode 26 and an outlet tube 33 connects to bottom edge 25 directly below the discharge conduit 32. These pass through holes 29 and 29a respectively in support panel 11. Preferably the tube 27 is provided with annular grooves containing O-rings which snugly seal the tube 27 within hole 29. The discharge tube 33 is formed slightly smaller than hole 29a to facilitate inserting and withdrawing the metal-air cell 12. To prevent leakage of air through holes 29a, a thin foam or rubber pad with small holes may be placed on the panel 11 over the holes 29a. The discharge tubes pass through the small holes in the pad and then through the larger holes 29a.

Immediately below the inlet tubes 27 is mounted a manifold or manifolds 15 extending across beneath support panel 11. Preferably there is a divider wall 50 providing two manifolds, one for each aligned row of metal-air cells. As shown in FIG. 4, four inlet tubes 16 feed into the manifold 15, two of these tubes feeding into one half of the manifold and two into the other half. The inlet end of the four tubes 16 connect to a second manifold 17 which in turn connects to three submersible centrifugal pumps 19 by way of outlet lines 18. Two of the three outlet lines 18 are provided with reverse flow check valves 49. The pumps 19 have inlets 20 which are preferably positioned well above the bottom of the electrolyte reservoir. All tubing, connectors and manifold are preferably made of a non-conducting material in order to reduce possible shunt currents.

The electrolyte reservoir preferably has a divider wall 14 with an upper edge 14a forming an overflow weir. As can be seen from FIG. 1, the electrolyte will, after some discharge time has elapsed, have a higher level to the right of the weir and a lower level to the left of the weir. Partially clarified electrolyte overflows from the right side to the left side of the weir.

Inlets 20 for pumps 19 are positioned in the downstream side of the reservoir for pumping partially clarified electrolyte up through manifolds 17 and 15 and through the metal-air cells 12. The electrolyte travels from the manifold 15 in an upward direction through the gaps between the anode and cathodes simultaneously flushing any reaction product formed in the gaps. The electrolyte with reaction product is carried over the weir 31 and down discharge conduit 32 and outlet 33 back into the upstream side of the electrolyte reservoir. The reaction product S settles to the bottom of the upstream side with the partially clarified electrolyte flowing over the weir for recycle through the metal-air cells.

An air distributor wall 35 is provided adjacent the metal-air cells 12 with openings 66 opposite the gaps between the cells for discharge of air through the gaps. A blower 34 feeds air to the distributor wall 35, this blower being powered by electricity generated by the battery. In operation, the compartment containing the metal-air cells is sealed within a cover 55 as shown in FIG. 2 except for the air inlets 66 and the gaps 36 in the support panel 11. This compartment cover includes the air distributor wall 35, a pair of side walls 56, an end wall 57 opposite wall 35 and a removable lid 58. The walls 35, 56 and 57 are tightly sealed together and the bottom edges of the four walls are tightly sealed to the top of the housing 10, while the lid 58 is tightly connected to the top edges of the four walls. Alternatively, the lid 58 may be sealed to the walls and the entire compartment cover may be removable. Thus, when the blower 34 is in operation, air is blown across through the gaps between the metal-air cells 12 and down through the support panel openings 36 into the reservoir. The air then travels in the reverse direction across the surface of the electrolyte in the reservoir, picking up hydrogen, then through demister curtain 70 and fiber demisting pads 40 and is discharged to the atmosphere upwardly through a plurality of metal tubes 38 of condenser 37. Heat exchange in the condenser is enhanced by means of a plurality of mechanically bonded metal fins 39 through which air is blown from fans 41. Alternatively, the condenser may be water cooled.

The electrolyte may be cooled by means of a heat exchanger 42, the heat exchange taking place between metal tubes 43 and metal fins 44 by way of air fans 48. The electrolyte is pumped by way of pump 45 upwardly through tube 46, through the heat exchanger and is discharged back into the reservoir via discharge line 47. The operation of the heat exchanger fans is controlled by a thermal switch set to a predetermined temperature.

The condenser and heat exchanger may be protected by a cover 60 as shown in FIG. 3 and consisting of two sides 61, one end wall 63 and a top wall 64. Side walls 61 contain openings 62 to permit free flow of air around the condenser, heat exchanger and circulating air blower. The top wall 64 has an outlet 65 serving as an exhaust from condenser tubes 38. This outlet 65 may be connected to an exhaust vent.

A small auxilliary battery is used to start the battery of the invention, this auxilliary battery being connected to the pumps 19. Thus, when the pumps 19 are activated, they commence pumping electrolyte upwardly through manifolds 17 and 15. Since gas may accumulate in the manifolds, it is desirable to provide a means for venting gas before it passes upwardly through the metal-air cells by providing small holes in the upper regions of the side walls of manifold 15. After the gas is fully eliminated from the manifold, there continues to be a slight flow of electrolyte through the holes. As soon as the electrolyte makes contact between the anode and cathode, electricity generation commences and the auxilliary battery is no longer required. The pumps 19 and 45, the blower 34 and the fans 41 and 48 are all driven by excess power from the battery of the invention. It is also possible to provide a manual pumping device to start the battery, thereby avoiding the need for the auxilliary battery.

The three pumps 19 provide a sufficiently excess flow capacity that two of the three pumps can fail and sufficient electrolyte will still be pumped to fill the metal-air cells with electrolyte and keep the battery operational. In order to prevent a flow short circuit through a failed pump, reverse flow check valves 49 are provided on all except one pump.

When it is desired to stop the battery for any reason, such as replacing the metal-air cells, it is simply a matter of stopping the pumps whereby the electrolyte drains out of the metal-air cells and the cells can be replaced. Thus, the battery can be placed back into immediate operation and individual cells can be opened and the anodes replaced at a convenient time.

In order to flush the system, a one-way discharge valve outlet may be provided in a side wall 13 of housing 10 at a level above the highest permissible accumulation of reaction product solids 5 and below the level of weir 14a. Thus, with the one-way valve in the open position, water can be fed into the pump side of the electrolyte reservoir and then circulated through the pumps and cells into the upstream side of the electrolyte reservoir. Simultaneously, liquid flows from the reservoir out through the one-way valve. In this manner, all caustic except for that held within the solids deposit S may be flushed out of the battery.

A battery of the design shown in FIGS. 1–6 was produced with 20 aluminum-air cells. Each aluminum anode had a thickness of 13 mm, a height of 18.2 cm and a width of 11.1 cm. The cathodes used were type AE-20 gas-diffusion cathodes made by Electromedia Inc. The cells each had a thickness of 1.7 cm, a height of 23.0 cm and a width of 13.0 cm.

The electrolyte was 5M KOH with 0.005M sodium stannate and it was pumped through the aluminum-air cells at a flow rate of 15 l/min. Air was circulated between the cells and through the reservoir at a rate of about 28 l/min. This battery provided over 500 watts continuously for more than 60 hours with an output current of approximately 19 amps. The battery also had a net energy output of over 300 watt-hours per kg of battery weight.

In order to determine how the Al/KOH ratio behaves as a function of discharge time, a computer simulation was carried out based on the equation shown on page 4 at 72.5 watts per cell and seed additions of 3.30 and 60 grams. The results are shown in FIG. 7 and it can be seen that the higher the seed charge and the earlier it is added, the lower the maximum Al/KOH ratio attained. Because the electrical conductivity of the solution diminishes as the Al/KOH ratio increases, the effect of the seed additions is reflected in the cell voltage as represented by the family of full line curves in FIG. 7.

It has been determined that if sufficient seed is added to keep the Al/XOH ratio below 0.60, current densities as high as 180 mA/cm$^2$ are possible without anode passivation and that to maintain a current density of 60 mA/cm$^2$, sufficient seed to maintain the ratio below 0.70 is all that is required. Also, with sufficient seed present to avoid an excessively high supersaturation level, crystal growth and secondary nucleation are the precipitation mechanisms, solution viscosity is kept low and the solid material can settle out in the sedimentation zone off the battery, thereby avoiding cell clogging and resultant battery failure.

As can be seen from the dashed lines in FIG. 7, once the peak value of the Al/XOH ratio has been passed, the ratio becomes constant, striking a balance between the rate of aluminum dissolution and precipitation and seed sedimentation rate. In this way no further passivation is threatened and the lifetime or discharge time of the battery is extended by a factor of 4 to 5 times that which can be obtained in the absence of added seed.

Certain preferred embodiments of the invention are shown in the following non-limiting examples.

The properties and specification of the various Baikalox aluminas produced by a deagglomeration process are given in the following table:

| Powder Name | Baikalox CR30 | Baikalox CR15 | Baikalox CR10 | Baikalox CR1 |
|---|---|---|---|---|
| Purity, % Al$_2$O$_3$ | 99.99 | 99.99 | 99.99 | 99.99 |
| Major Phase | alpha | alpha | alpha | alpha |
| % Major Phase | 65% | 85% | 90% | 97% |
| Crystal Density, gm/cm$^3$ | 3.98 | 3.98 | 3.98 | 3.98 |
| Bulk Density, gm/cm$^3$ | 0.32 | 0.46 | 0.51 | 0.70 |
| Pressed Density, 2000 PSI gm/cc | 1.04 | 1.32 | 1.45 | 1.62 |
| Ultimate particle size, microns | 0.05 | 0.1 | 0.15 | <1.5 |
| Mean Agglomerate size, microns | <0.5 | <0.5 | <0.6 | <1.5 |
| Specific surface area, B.E.T., m$^2$/gm | 30 ± 1 | 15 ± 1 | 10 ± 1 | 1 |
| Loss of ignition, % | 1.0 | .65 | .25 | — |
| Agglomerate size distribution | Cumulative Weight Percent by sedigraph | | | |
| <0.3 μm | 34 | 31 | 13 | — |
| <0.4 μm | 44 | 45 | 24 | — |
| <0.5 μm | 53 | 56 | 38 | — |
| <0.6 μm | 59 | 68 | 52 | 9 |
| <1.0 μm | 78 | 88 | 82 | 45 |
| <2.0 μm | 93 | 99 | 95 | 88 |
| <5.0 μm | 97 | 100 | 98 | 97 |
| <10.0 μm | 100 | — | 100 | 100 |

EXAMPLE 1

A supersaturated solution of caustic potassium aluminate was prepared using 4.1M KOH and 3.0M Al. Three separate containers holding this solution were placed in a constant temperature bath at 50° C. To one solution was added 20 g/l of regular hydrargillite seed, to a second solution was added 20 g/l of Baikalox CR-15 and no seed was added to the third solution. The solution conductivities were monitored with in-situ sensors, with an increase in electrical conductivity being symptomatic of hydragillite precipitation according to the reaction:

$$Al(OH)_4^- \rightarrow Al(OH)_3 \downarrow + OH^-$$

Figure 8:
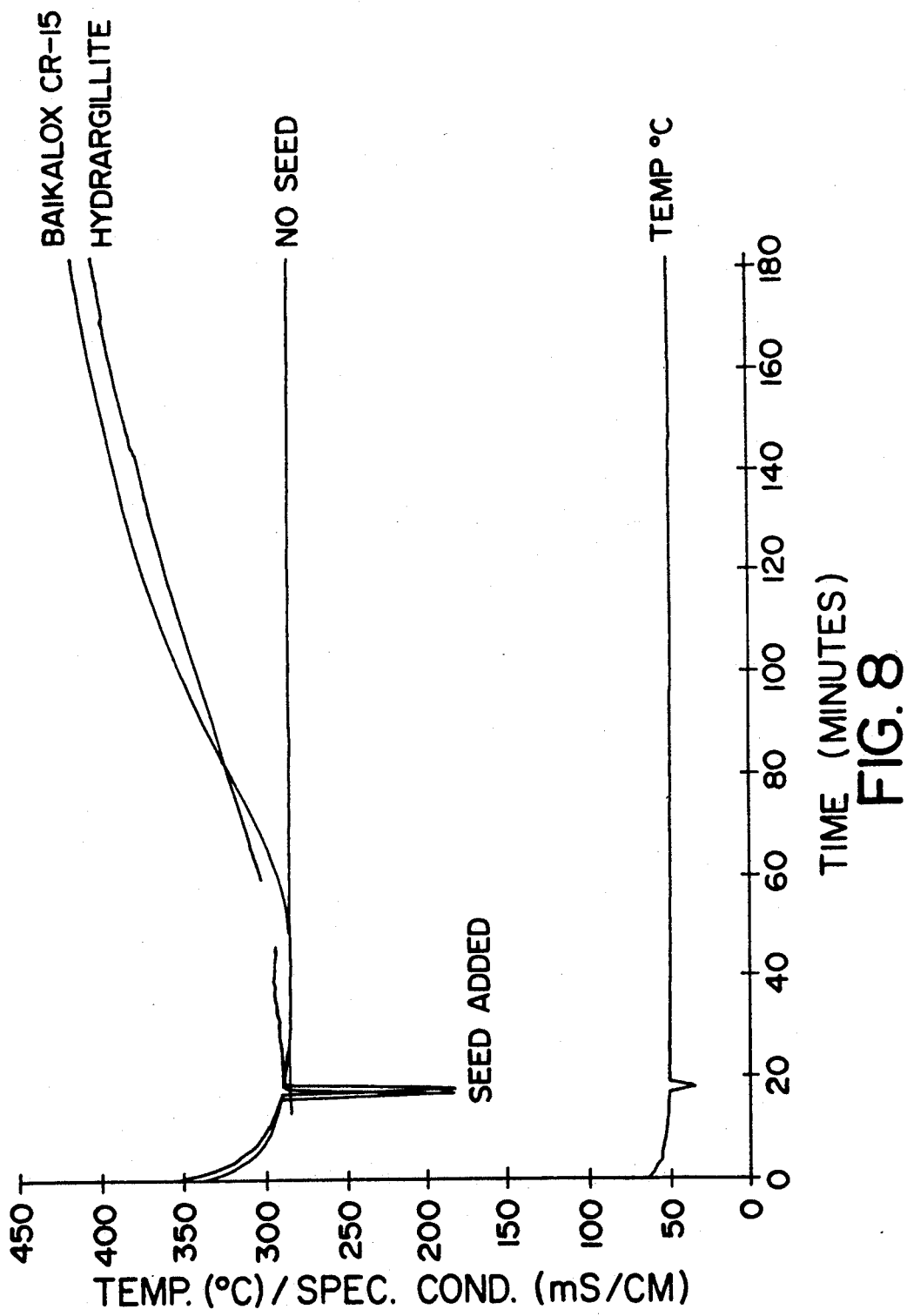
FIG. 8 is a plot of specific conductance of a supersaturated KOH-aluminate solution as a function of holding time using hydrargillite and Baikalox CR-15 seeds.

The results in FIG. 8 show that Baikalox CR-15 is an effective seed.

EXAMPLE 2

Figure 9:
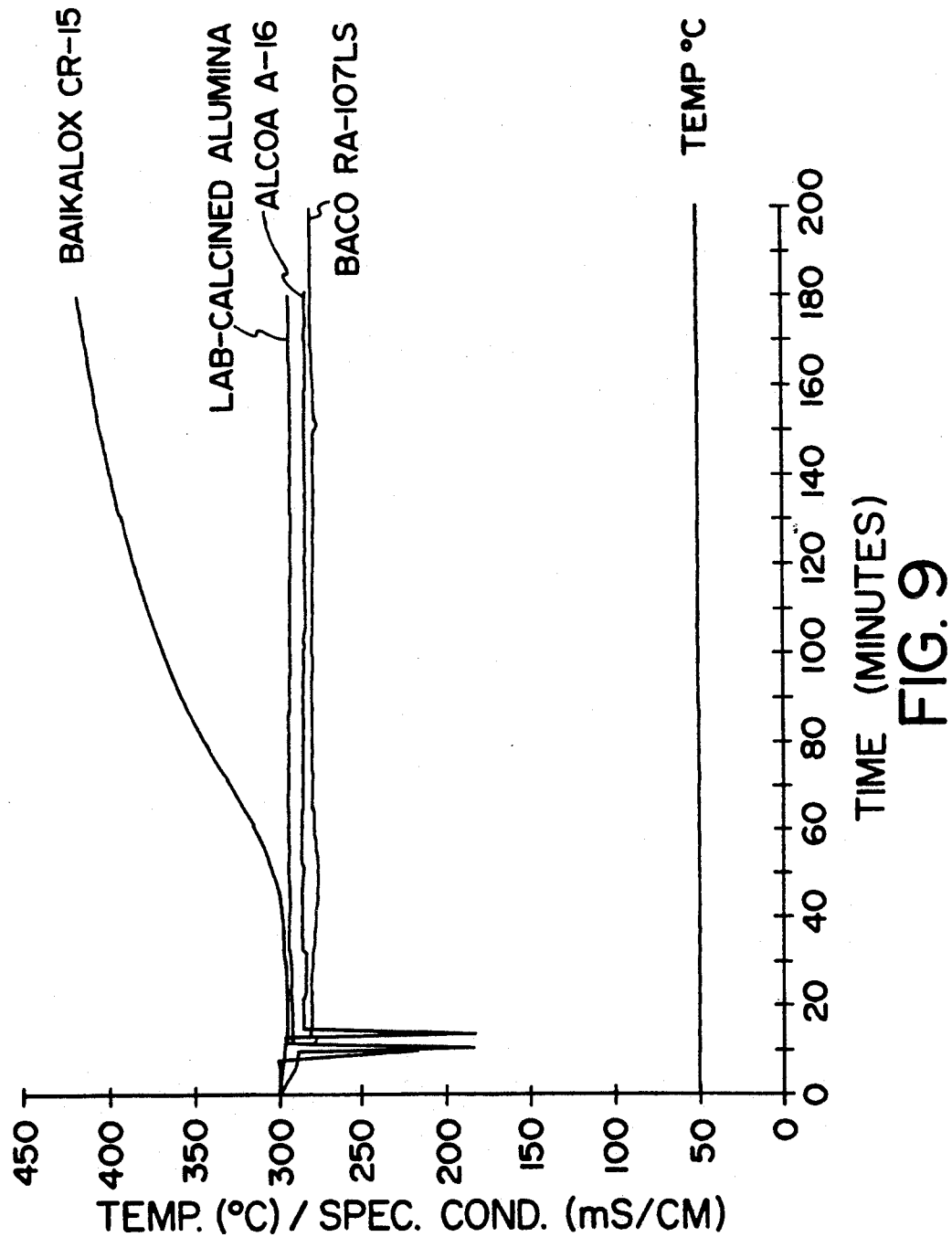
FIG. 9 is a plot of specific conductance of a supersaturated KOH-aluminate solution as a function of holding time using a variety of $\alpha$-aluminas as seeds.

The procedure of Example 1 was repeated using a solution prepared from 4.5M KOH and 3.3M Al. Four different α-alumina seeds were tested, including 40 g/l of Baikalox CR-15, 40 g/l of laboratory-calcined alumina, 80 g/l of Alcoa A-16 and Baco RA-107LS. The results in FIG. 9 show the ineffectiveness of the α-alumina other than Baikalox CR-15.

EXAMPLE 3

Figure 10:
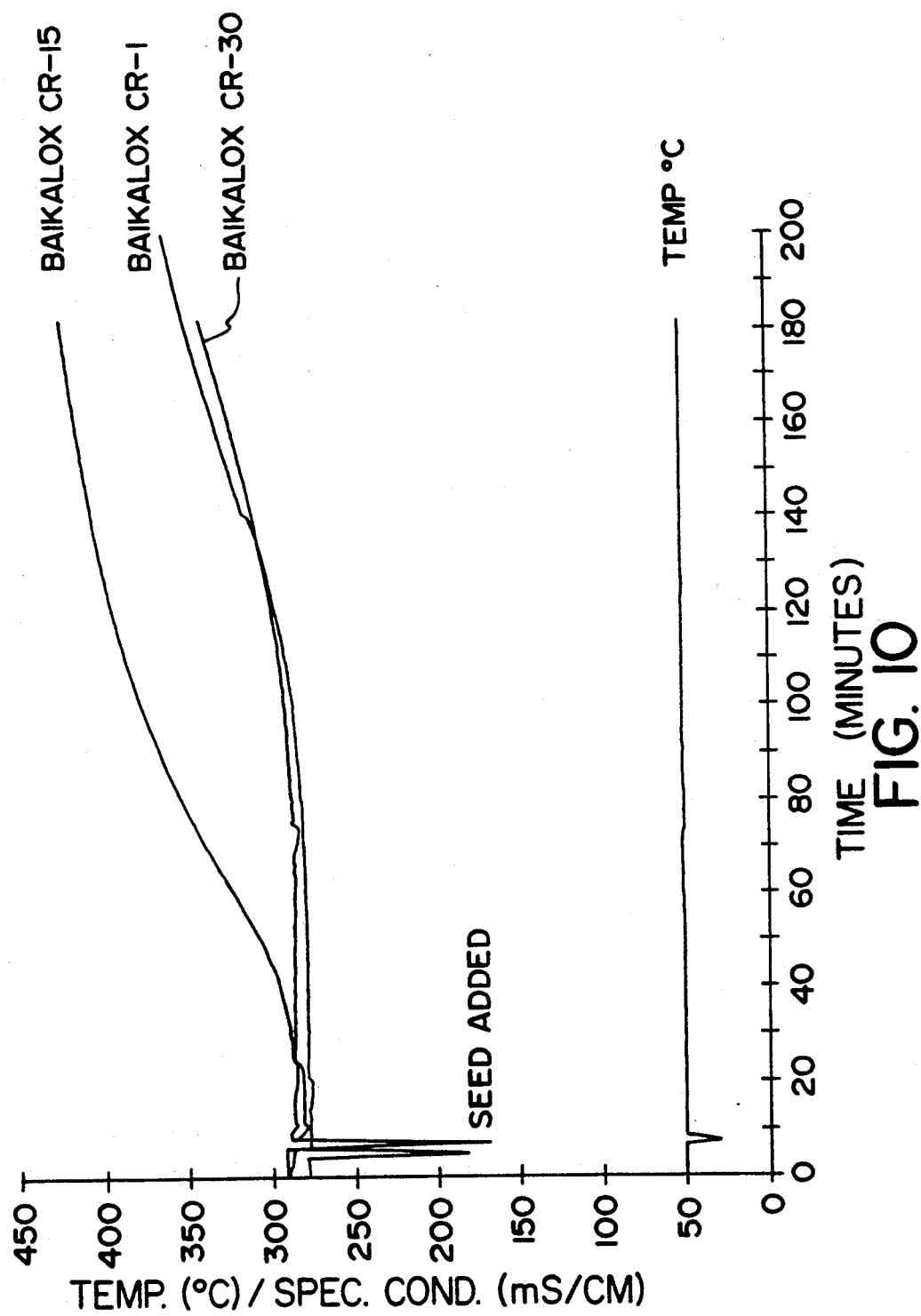
FIG. 10 is a plot of specific conductance of a supersaturated KOH-aluminate solution as a function of holding time using different Baikalox aluminas as seeds.

The procedure of Example 1 was again followed using a solution prepared from 4.5M KOH and 3.27M Al. Three different Baikalox alumina seeds were tested, including 20 g/l Baikalox CR-15, 20 g/l Baikalox CR-30 and 40 g/l Baikalox CR-1. The results in FIG. 10 show the superiority of Baikalox CR-15.

EXAMPLE 4

Figure 11:
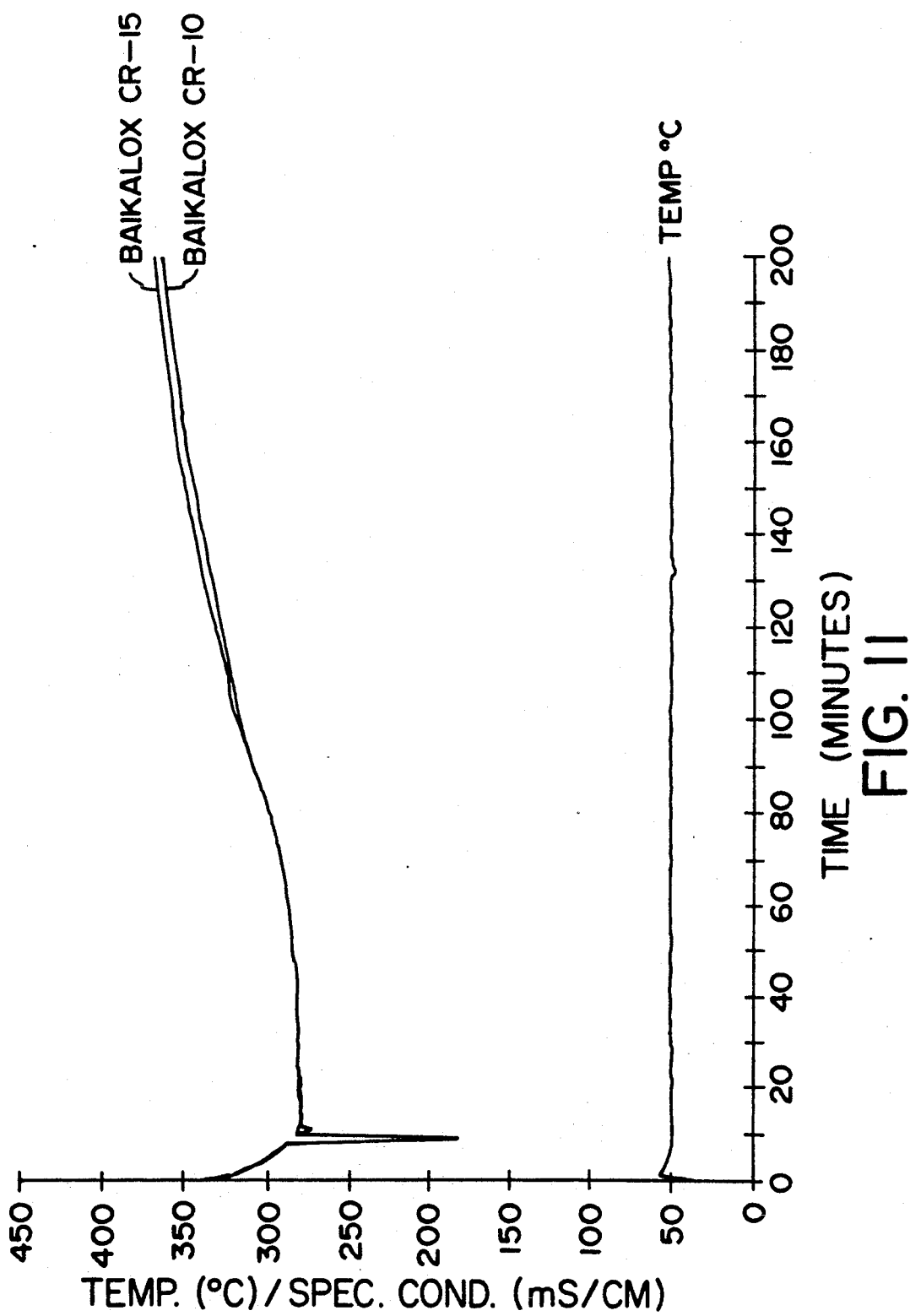
FIG. 11 is a plot of specific conductance of a supersaturated KOH-aluminate solution as a function of holding time using Baikalox CR-15 and CR-10 as seeds.

The procedure of Example 1 was following using a solution prepared from 5.0M KOH and 3.6M Al. Tests were conducted using 40 g/l Baikalox CR-15 and 40 g/l Baikalox CR-10. The results in FIG. 11 show these to be equally effective.

EXAMPLE 5

The procedure of Example 1 was followed using a solution prepared from 4.5M KOH and 3.3M Al. The tests were conducted using 10 g/l hydrargillite seed and different concentrations of Baikalox CR-15. The results in FIG. 12 show the relative effectiveness of different dosages of Baikalox CR-15 compared with the hydrargillite.

I claim:

1. In a method of operating a caustic-based metal battery of the type comprising a cathode adapted to reduce oxygen and a metal anode positioned in spaced juxtaposed relation to said cathode to define therewith an anode-cathode gap for receiving electrolyte to form an anode-cathode pair electrically coupled by electrolyte, wherein electrolyte is supplied to said anode-cathode gap and oxygen is supplied to said cathode
the improvement which comprises providing in said anode-cathode gap an alkaline electrolyte containing seed particles adapted to seed alumina trihydrate particles and prevent passivation of the anode during discharge of the battery, said seed particles being α-alumina of very fine particle size distribution obtained by calcination of high-purity alum.

2. A method according to claim 1 wherein the metal is aluminum or aluminum alloy.

3. A method according to claim 2 wherein the seed is in the form of small particles of less than 1 micron.

4. A method according to claim 2 wherein the seeds are particles of high purity, ceramic grade α-alumina powder of very fine particle size distribution obtained by calcination of high-purity alum.

5. A method according to claim 3 wherein the battery includes an electrolyte reservoir and the electrolyte is circulated from the reservoir through the anode-cathode gap.

6. A method according to claim 5 wherein the cathode is an air cathode having one face exposed to air or oxygen and an opposite face in contact with the electrolyte.

7. A method according to claim 5 wherein the cathode comprises a nickel surface impregnated with catalyst and the electrolyte contains an oxidant.

8. A caustic-based metal battery comprising a cathode adapted to reduce oxygen and a metal anode positioned in spaced juxtaposed relation to said cathode to define therewith an anode-cathode gap for receiving electrolyte to form an anode-cathode pair electrically coupled by electrolyte, said battery containing an alkaline electrolyte and seed particles adapted to decrease passivation of the anode during discharge of the battery, said seed particles being α-alumina of very fine particle size distribution obtained by calcination of high-purity alum.

9. A battery according to claim 8 wherein the metal anode comprises aluminum or aluminum alloy.

10. A battery according to claim 9 wherein the seed particles are less than 1 micron.

11. A battery according to claim 10 which includes an electrolyte reservoir and means for circulating electrolyte from the reservoir through the anode-cathode gap.

12. A battery according to claim 10 wherein the cathode is an air cathode.

13. A battery according to claim 10 wherein the cathode comprises a nickel surface impregnated with catalyst and the electrolyte contains an oxidant.

* * * * *